United States Patent
Zhou et al.

(10) Patent No.: US 10,901,278 B2
(45) Date of Patent: Jan. 26, 2021

(54) ELECTRORESPONSIVE LIQUID CRYSTAL DIMMING DEVICE

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangzhou (CN); Xiaowen Hu, Guangzhou (CN); Wei Zhao, Guangzhou (CN); Haitao Sun, Guangzhou (CN); Wenmin Yang, Guangzhou (CN); Lingling Shui, Guangzhou (CN)

(73) Assignees: South China Normal University, Guangzhou (CN); Shenzhen Guohua Optoelecironics Co., Ltd., Shenzhen (CN); Academy of Shenzhen Guohua Optoelectronics, Shenzhen (CN)

( * ) Notice: Subject to any disclaimer, the term of this patent is extended or adjusted under 35 U.S.C. 154(b) by 0 days.

(21) Appl. No.: 16/498,740

(22) PCT Filed: Oct. 10, 2018

(86) PCT No.: PCT/CN2018/109633
§ 371 (c)(1),
(2) Date: Sep. 27, 2019

(87) PCT Pub. No.: WO2019/200851
PCT Pub. Date: Oct. 24, 2019

(65) Prior Publication Data
US 2020/0333647 A1    Oct. 22, 2020

(30) Foreign Application Priority Data
Apr. 18, 2018  (CN) .......................... 2018 1 0350644

(51) Int. Cl.
G02F 1/1347   (2006.01)
G02F 1/1334   (2006.01)
G02F 1/137    (2006.01)

(52) U.S. Cl.
CPC ............ *G02F 1/1347* (2013.01); *G02F 1/137* (2013.01); *G02F 1/1334* (2013.01);
(Continued)

(58) Field of Classification Search
None
See application file for complete search history.

(56) References Cited

U.S. PATENT DOCUMENTS 4,566,758 A * 1/1986 Bos .................. G02F 1/1395
                                              349/128
5,695,682 A * 12/1997 Doane .................. C09K 19/02
                                              252/299.01
(Continued)

FOREIGN PATENT DOCUMENTS

CN      101566755       10/2009
CN      103242863       8/2013
(Continued)

*Primary Examiner* — Shan Liu
(74) *Attorney, Agent, or Firm* — Gottlieb Rackman & Reisman PC

(57) ABSTRACT

The present disclosure discloses an electroresponsive liquid crystal dimming device comprising a first light transmitting conductive substrate, a first polymer network stabilized liquid crystal layer, a positive liquid crystal layer, a second polymer network stabilized liquid crystal layer and a second light transmitting conductive substrate which are arranged in sequence; and the first polymer network stabilized liquid crystal layer and the second polymer network stabilized liquid crystal layer reflect the circularly polarized light having the same polarization direction. The conversion of the positive liquid crystals in each layer between different states is driven by changing the magnitude of the access
(Continued)

voltage of the liquid crystal dimming device according to the present disclosure, thereby realizing the adjustment of blurring to transparent states and color to colorless states of the liquid crystal dimming device, having a good application prospect in the window glass, and home glass window, and the like.

8 Claims, 2 Drawing Sheets

(52) U.S. Cl.
CPC .............. *G02F 2001/13345* (2013.01); *G02F 2001/13706* (2013.01); *G02F 2001/13775* (2013.01); *G02F 2202/06* (2013.01)

(56) References Cited

U.S. PATENT DOCUMENTS

| | | | | |
|---|---|---|---|---|
| 6,317,189 | B1* | 11/2001 | Yuan | G02F 1/13342 349/176 |
| 6,392,725 | B1* | 5/2002 | Harada | G02F 1/13473 349/176 |
| 6,885,414 | B1* | 4/2005 | Li | G02F 1/13471 349/113 |
| 2002/0118328 | A1* | 8/2002 | Faris | G01D 11/28 349/114 |
| 2008/0106689 | A1 | 5/2008 | Inoue et al. | |
| 2008/0111807 | A1* | 5/2008 | Yan | H02M 3/33561 345/211 |
| 2009/0161042 | A1* | 6/2009 | Inoue | G09G 3/3648 349/96 |
| 2010/0141859 | A1 | 6/2010 | Park et al. | |
| 2019/0361272 | A1* | 11/2019 | Yang | G02B 6/0041 |

FOREIGN PATENT DOCUMENTS

| | | |
|---|---|---|
| CN | 104391406 | 3/2015 |
| CN | 106646986 | 5/2017 |
| CN | 107346084 | 11/2017 |

\* cited by examiner

ELECTRORESPONSIVE LIQUID CRYSTAL DIMMING DEVICE

CROSS-REFERENCE TO RELATED APPLICATIONS

This application is the United States National Stage entry under 35 U.S.C. 371 of PCT/CN2018/109633, filed on Oct. 10, 2018, which in turn claims the priority of Chinese patent application No. 201810350644.1 "ELECTRORESPONSIVE LIQUID CRYSTAL DIMMING DEVICE", filed on Apr. 18, 2018, both of which are hereby incorporated by reference in their entirety.

FIELD OF THE INVENTION

The present disclosure relates to the field of building and home life, in particular to an electroresponsive liquid crystal dimming device.

BACKGROUND OF THE INVENTION

In order to achieve the balance between privacy protection and daylighting, traditional ways such as curtain, louver or film coating are generally used. Among them, the coated glass can block visible light very well, but the coated glass cannot protect privacy very well under low light intensity. In addition, once the film coating is shaped, it is impossible to change the optical properties as needed, and the color is relatively unitary.

A liquid crystal-based smart glass can adjust the optical properties such as transmission, reflection and scattering of the light as needed, and can obtain abundant colors by doping substances such as dye and the like. Taking the dye-doped color smart window as an example, the dye-doped color smart window controls the rotation of the liquid crystal molecules by an external voltage to drive the change of the arrangement of the dye molecules, so as to achieve the transmission or absorption of sunlight to meet people's needs. However, the dye molecules may undergo discoloration and other changes under the action of ultraviolet light, which affects the stability of the dye-doped smart window. Since the dye molecules cannot reach an ideal orientation state, the dye molecules still exhibit absorption behavior when the dye-doped smart window is in a transparent state, making the smart window unable to achieve a colorless and transparent state.

SUMMARY OF THE INVENTION

In view of the shortcomings of the prior art, the technical problem to be solved by the present disclosure is to provide an electroresponsive liquid crystal dimming device, which can replace the function of the curtain to a certain extent, solve the limitation of the coated glass and use no dyes, and solve the limitation of the dye.

The technical solution adopted by the present disclosure is:

The present disclosure provides an electroresponsive liquid crystal dimming device, it comprises a first light transmitting conductive substrate a first polymer network stabilized liquid crystal layer, a positive liquid crystal layer, a second polymer network stabilized liquid crystal layer and a second light transmitting conductive substrate which are arranged in sequence; the first polymer network stabilized liquid crystal layer and the second polymer network stabilized liquid crystal layer are made by curing a liquid crystal mixture by ultraviolet light; the liquid crystal mixture comprises a positive liquid crystal, a chiral dopant, a photoinitiator and a photopolymerizable liquid crystal monomer; and the first polymer network stabilized liquid crystal layer and the second polymer network stabilized liquid crystal layer reflect the circularly polarized light having the same polarization direction. Under the ultraviolet light, the polymerizable liquid crystal monomer forms a polymer network under the action of the chiral dopant and the photoinitiator, and the positive liquid crystal is dispersed in the polymer network.

Preferably, the liquid crystal mixture comprises 50 to 88.9 parts by mass of the positive liquid crystal, 8 to 25 parts by mass of the chiral dopant, 0.1 to 5 parts by mass of the photoinitiator, and 3 to 20 parts by mass of the liquid crystal monomer.

Preferably, the chiral dopant is a left-hand chiral dopant or a right-hand chiral dopant, and the left-hand chiral dopant is at least one of S1011 and S811, and the right-hand chiral dopant is at least one of R1011 and R811.

Preferably, the liquid crystal monomer is at least one of HCM008 and HCM009.

Preferably, the electroresponsive liquid crystal dimming device further comprises a power supply assembly, wherein the power supply assembly is electrically connected to the first light transmitting conductive substrate and the second light transmitting conductive substrate.

Further, the power supply assembly comprises an alternating current power supply and a voltage controller connected in series with the alternating current power supply.

Preferably, the first polymer network stabilized liquid crystal layer and the second polymer network stabilized liquid crystal layer have a thickness of 5-100 μm.

Preferably, the positive liquid crystal layer has a thickness of 5-50 μm.

The advantages of the present disclosure are presented as follows:

Compared with the single arrangement mode in which the liquid crystal is dispersed in the polymer network, the electroresponsive liquid crystal dimming device of the present disclosure adopts a mode of combining the first polymer network stabilized liquid crystal layer, the positive liquid crystal layer and the second polymer network stabilized liquid crystal layer, and the purpose of total reflection of the circularly polarized light in a certain wave band can be achieved when no voltage is applied. At this time, the liquid crystal dimming device shows a dark and transparent state, and after applying a voltage, the orientation of the positive liquid crystal in the polymer network stabilized liquid crystal layer and the positive liquid crystal layer can be altered. The conversion of the positive liquid crystals in each layer between different states is driven by changing the magnitude of the access voltage, thereby adjusting the reflection, scattering or transmission of the light, causing the state of the liquid crystal dimming device to change in an order of dark color and transparent, light color and transparent, colorless and opaque, and colorless and transparent in sequence, which further realize the adjustment of blurring and transparency of the liquid crystal dimming device, avoiding the problem that the single setting mode cannot change the color depth of the device, thus the electroresponsive liquid crystal dimming device has a good application prospect in the window glass, and home glass window, and the like.

DETAILED DESCRIPTION OF THE EMBODIMENTS

The concept and the technical effects of the present disclosure are clearly and completely described in connection with the embodiments below, to fully understand the object, feature and effect of the present disclosure. It is apparent that the described embodiments are only a part of the embodiments of the present disclosure, and not all of the embodiments, based on the embodiments of the present disclosure, other embodiments obtained by those skilled in the art without creative efforts belong to the scope of protection of the present disclosure.

Embodiment 1

Figure 1:
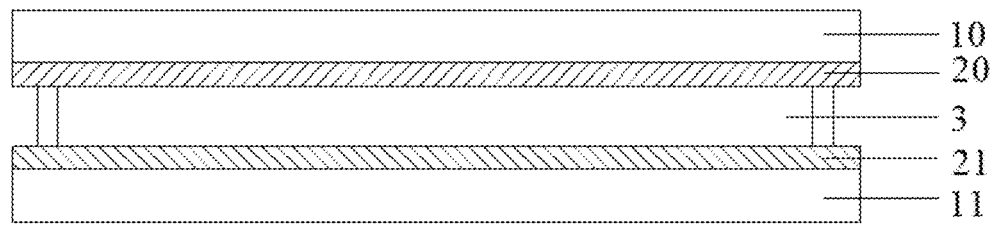
FIG. 1 is a structural schematic diagram of the electro-responsive liquid crystal dimming device of the present disclosure.

Referring to FIG. 1, this embodiment provides an electroresponsive liquid crystal dimming device. The electroresponsive liquid crystal dimming device comprises a first light transmitting conductive substrate 10, a first polymer network stabilized liquid crystal layer 20, a positive liquid crystal layer 3, a second polymer network stabilized liquid crystal layer 21 and a second light transmitting conductive substrate 11 which are arranged in sequence; the first polymer network stabilized liquid crystal layer 20 and the second polymer network stabilized liquid crystal layer 21 are made by curing a liquid crystal mixture by ultraviolet light; the liquid crystal mixture comprises a positive liquid crystal HTW138200-100, a chiral dopant S1011, a photoinitiator Irgacure 651 and a photopolymerizable liquid crystal monomer HCM009; and the first polymer network stabilized liquid crystal layer 20 and the second polymer network stabilized liquid crystal layer 21 reflect the circularly polarized light having the same polarization direction.

This embodiment further provides a method for preparing the above-mentioned electroresponsive liquid crystal dimming device, comprising the following steps: in a yellow light environment, taking 15 parts by mass of a polymerizable monomer HCM009, 9 parts by mass of a left-hand chiral dopant S1011, 0.5 parts by mass of a photoinitiator Irgacure651, and 75.5 parts by mass of a positive liquid crystal HTW138200-100 and placing them in a brown bottle, then stirring at 60° C. for 2 hours to prepare a liquid crystal mixture; under the condition of yellow light, heating the liquid crystal mixture, a scraping rod and a clean light transmitting conductive glass substrate to 50° C.; scraping the liquid crystal mixture onto the substrate by the scraping rod, wherein the thickness of the scraped liquid crystal mixture was 15 μm; curing the scraped liquid crystal mixture by using an ultraviolet light source at a power of 200 W for 15 min to polymerize the polymerizable liquid crystal monomer in the liquid crystal mixture, to form a polymer network stabilized liquid crystal layer; after cooling the conductive glass substrate coated with the polymer network stabilized liquid crystal layer to room temperature, immersing two same conductive glass substrates in n-hexane or cyclo-hexane for 48 hours to remove the unreacted liquid crystal molecules and the chiral dopant, then drying in a vacuum oven at 60° C. for 2 hours to remove n-hexane; preparing a liquid crystal cell by using the same two conductive glass substrates with a polymer network stabilized liquid crystal layer attached thereto, wherein a side having the polymer network stabilized liquid crystal layer was used as an inner surface, and the distance between the two substrates was 40 μm; filling the positive liquid crystal HTW138200-100 into the above-mentioned liquid crystal cell at 70° C.; naturally cooling the liquid crystal cell to room temperature, to prepare the electroresponsive liquid crystal dimming device.

The above-mentioned polymerizable liquid crystal monomer HCM009 (purchased from Jiangsu Hecheng Display Technology Co., Ltd.) has a chemical structural formula of

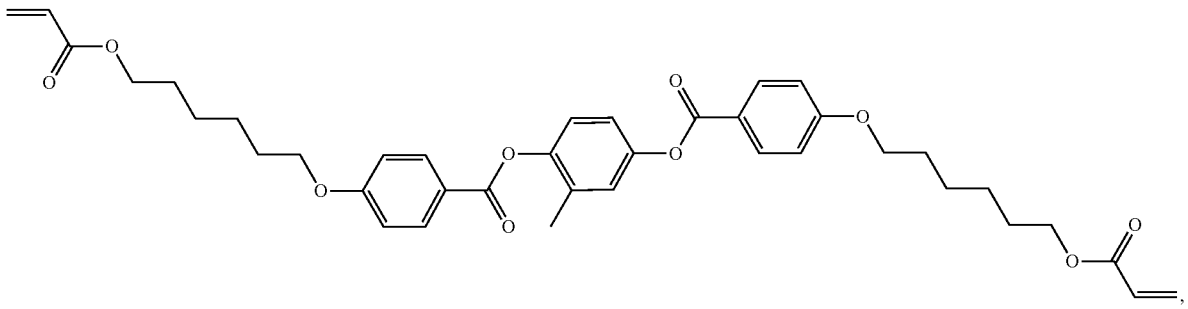 [SMILES: C=CC(=O)OCCCCCCOc1ccc(C(=O)Oc2ccc(OC(=O)c3ccc(OCCCCCCOC(=O)C=C)cc3)c(C)c2)cc1]

mer network stabilized liquid crystal layer 20 and the second polymer network stabilized liquid crystal layer 21 are made by curing a liquid crystal mixture by ultraviolet light; the the left-hand chiral dopant S1011 (purchased from Beijing Bayi Space Liquid Crystal Technology Co., Ltd.) has a structural formula of

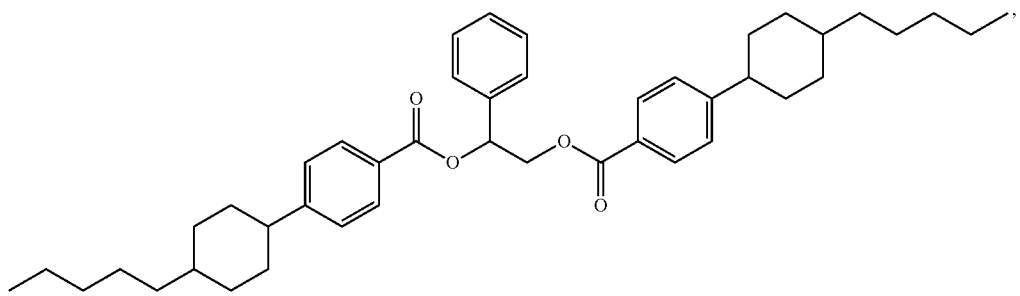 [SMILES: CCCCCC1CCC(c2ccc(C(=O)OCC(OC(=O)c3ccc(C4CCC(CCCCC)CC4)cc3)c3ccccc3)cc2)CC1]

and the photoinitiator Irgacure-651 (purchased from Tianjin Seans Biochemical Technology Co., Ltd) has a structural formula of:

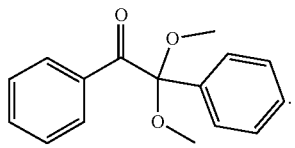 [SMILES: COC(OC)(C(=O)c1ccccc1)c1ccccc1]

Figure 2:
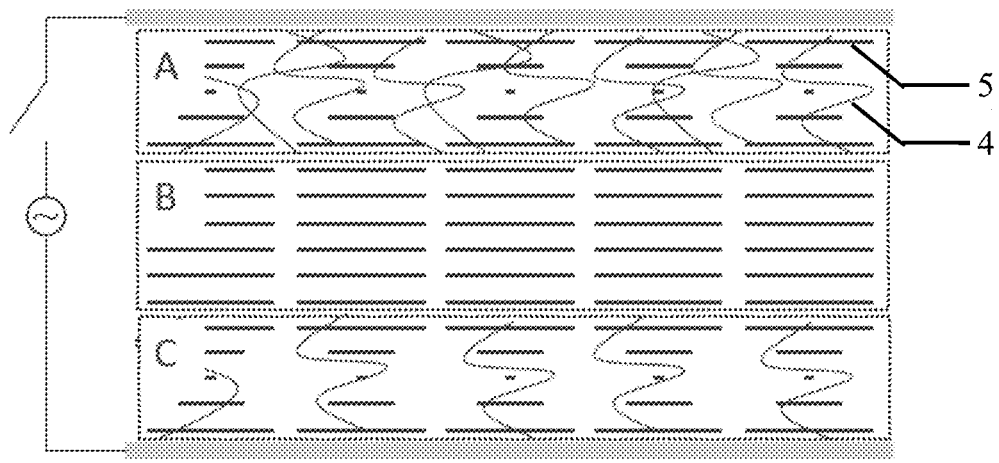
FIG. 2 is a schematic diagram of the electroresponsive liquid crystal dimming device in a state in which no voltage is applied.

Referring to FIG. 2 (the purpose of setting the dotted frame line is to clearly distinguish the first polymer network stabilized liquid crystal layer and the second polymer network stabilized liquid crystal layer and the positive liquid crystal layer), under the ultraviolet light, the polymerizable liquid crystal monomer in the liquid crystal mixture forms a polymer network 4 under the action of the chiral dopant and the photoinitiator, and the positive liquid crystal 5 is dispersed in the polymer network 4. When no voltage is applied, under the action of the polymer network 4, the positive liquid crystal 5 distributed in the first polymer network stabilized liquid crystal layer (region A in the Figure) and the second polymer network stabilized liquid crystal layer (region C in the Figure) is in a spiral structural arrangement in which the molecular long axis is parallel to the substrate, they can reflect the circularly polarized light with the same polarization direction (it can reflect the left-hand polarized light or both can reflect the right-hand polarized light). The reflection peaks of the positive liquid crystal distributed in the first polymer network stabilized liquid crystal layer and the second polymer network stabilized liquid crystal layer in an unpowered state are located in the visible light wave band, and the position of the reflection peak is determined by the concentration of the chiral dopant in the liquid crystal mixture, and the reflecting wave band of the liquid crystal dimming device can be altered by changing the concentration of the chiral dopant. In this embodiment, a left-hand chiral dopant is used, so that both the first polymer network stabilized liquid crystal layer and the second polymer network stabilized liquid crystal layer reflect the left-hand polarized light, and the positive liquid crystal layer in the middle of the first polymer network stabilized liquid crystal layer and the second polymer network stabilized liquid crystal layer (region B in the Figure) can convert the right-hand polarized light into the left-hand polarized light, and convert the left-hand polarized light into the right-hand helical polarized light. When sunlight incomes, for the circularly polarized light in a specific wave band, the first polymer network stabilized liquid crystal layer can reflect the left-hand polarized light therein, and transmit the right-hand polarized light. The positive liquid crystal layer converts the right-hand polarized light passing through the first polymer network stabilized liquid crystal layer into the left-hand polarized light, and then reflected by the second polymer network stabilized liquid crystal layer, thereby achieving the purpose of total reflection of the circularly polarized light in a certain wave band, at this time the liquid crystal dimming device shows a dark color and transparent state.

After the voltage is applied, by changing the magnitude of the access voltage, the positive liquid crystal distributed in the first polymer network stabilized liquid crystal layer and the second polymer network stabilized liquid crystal layer can be mutually converted among the spiral structural arrangement in which the molecular long axis is parallel to the substrate, a focal conic phase arrangement and an arrangement in which the molecular long axis is perpendicular to the substrate; the positive liquid crystal distributed in the positive liquid crystal layer can be mutually converted between the arrangement in which the molecular long axis is parallel to the substrate and the arrangement in which the molecular long axis is perpendicular to the substrate.

Figure 3:
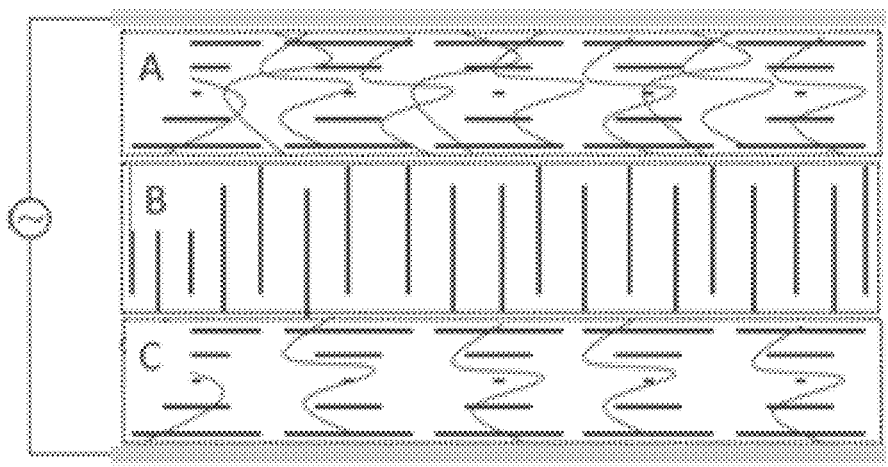
FIG. 3 is a schematic diagram of the electroresponsive liquid crystal dimming device in a light color and transparent state.

Referring to FIG. 3, when the external voltage is small, since the positive liquid crystal molecules of the positive liquid crystal layer (region B in the Figure) are converted into an arrangement mode in which the molecular long axis is perpendicular to the substrate, the left-hand polarized light cannot be converted into the right-hand polarized light, and the right-hand polarized light cannot be converted into the left-hand polarized light, thus the smart window can only reflect the left-hand polarized light in a certain wave band, at this time the liquid crystal dimming device is in a light color and transparent state.

Figure 4:
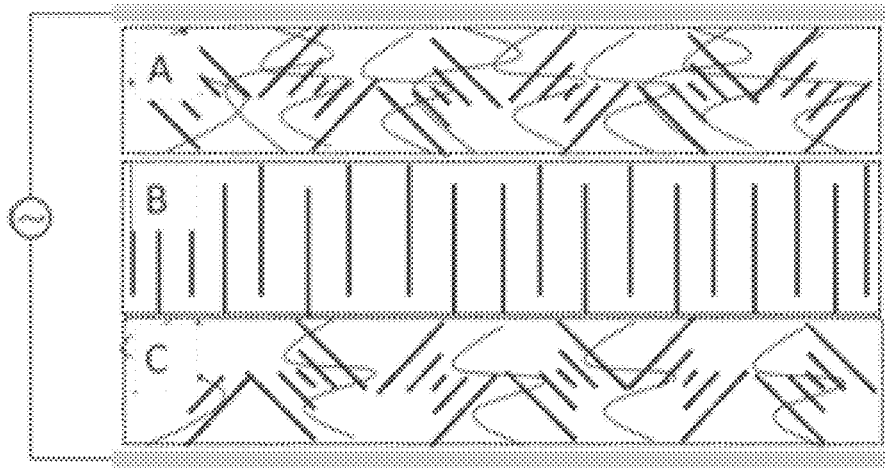
FIG. 4 is a schematic diagram of the electroresponsive liquid crystal dimming device in a colorless and opaque state.

Referring to FIG. 4, when the external voltage continues to increase, the arrangement mode of the positive liquid crystal molecules distributed in the first polymer network stabilized liquid crystal layer (region A in the Figure) and the second polymer network stabilized liquid crystal layer (region C in the Figure) is converted to the focal conic phase arrangement, the first polymer network stabilized liquid crystal layer and the second polymer network stabilized liquid crystal layer have a strong scattering effect on the visible light, at this time the liquid crystal dimming device is in a colorless and opaque state.

Figure 5:
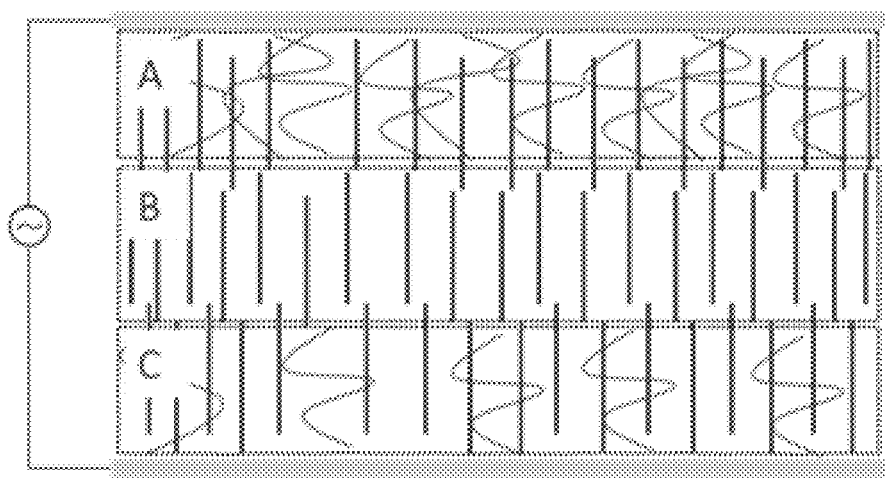
FIG. 5 is a schematic diagram of the electroresponsive liquid crystal dimming device in a colorless and transparent state.

Referring to FIG. 5, when the external voltage is sufficiently high, all the small molecule liquid crystals in the liquid crystal dimming device are converted into an arrangement mode in which the molecular long axis is perpendicular to the glass substrate, which has no influence on the light transmission. At this time, the liquid crystal dimming device is in a colorless and transparent state.

Embodiment 2

This embodiment provides an electroresponsive liquid crystal dimming device. The electroresponsive liquid crystal dimming device comprises a first light transmitting conductive substrate, a first polymer network stabilized liquid crystal layer, a positive liquid crystal layer, a second polymer network stabilized liquid crystal layer and a second light transmitting conductive substrate which are arranged in sequence; the first polymer network stabilized liquid crystal layer and the second polymer network stabilized liquid crystal layer have a thickness of 100 µm, and the positive liquid crystal layer has a thickness of 5 µm; the first polymer network stabilized liquid crystal layer and the second polymer network stabilized liquid crystal layer are made by curing a liquid crystal mixture by ultraviolet light; the liquid crystal mixture comprises 88.9 parts by mass of positive liquid crystal E7, 25 parts by mass of right-hand chiral dopant R811, 0.1 parts by mass of photoinitiator Irgacure 819, and 3 parts by mass of photopolymerizable liquid crystal monomer HCM008; and the first polymer network stabilized liquid crystal layer and the second polymer network stabilized liquid crystal layer reflect the right-hand polarized light.

The above-mentioned polymerizable liquid crystal monomer HCM008 (purchased from Jiangsu Hecheng Display Technology Co., Ltd.) has a chemical structural formula of

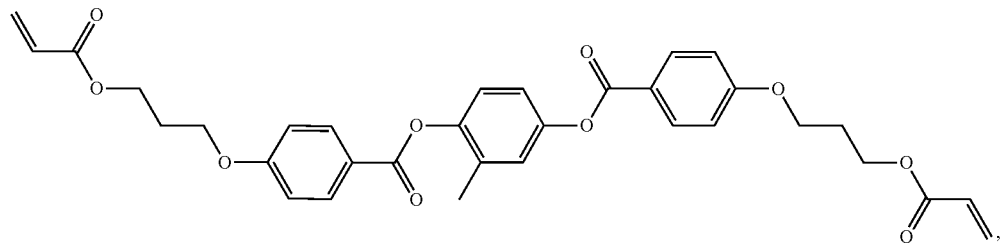 [SMILES: C=CC(=O)OCCCOc1ccc(C(=O)Oc2ccc(OC(=O)c3ccc(OCCCOC(=O)C=C)cc3)c(C)c2)cc1]

the left-hand dopant R811 (purchased from Beijing Bayi Space Liquid Crystal Technology Co., Ltd.) has a structural formula of:

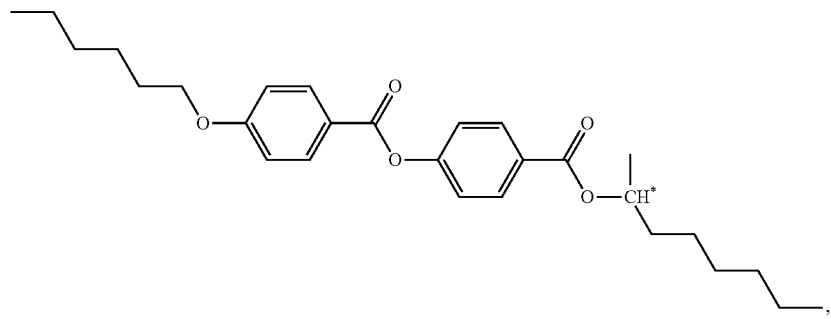

and the photoinitiator Irgacure-651 (purchased from Tianjin Seans Biochemical Technology Co., Ltd) has a structural formula of:

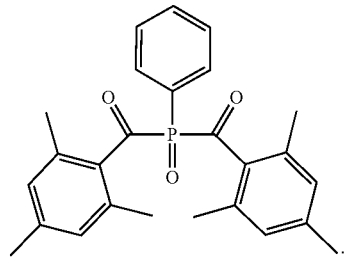

Embodiment 3

This embodiment provides an electroresponsive liquid crystal dimming device. The electroresponsive liquid crystal dimming device comprises a first light transmitting conductive substrate, a first polymer network stabilized liquid crystal layer, a positive liquid crystal layer, a second polymer network stabilized liquid crystal layer and a second light transmitting conductive substrate which are arranged in sequence; the first polymer network stabilized liquid crystal layer and the second polymer network stabilized liquid crystal layer have a thickness of 5 µm, and the positive liquid crystal layer has a thickness of 50 µm; the first polymer network stabilized liquid crystal layer and the second polymer network stabilized liquid crystal layer are made by curing a liquid crystal mixture by ultraviolet light; the liquid crystal mixture comprises 80 parts by mass of positive liquid crystal E7, 12 parts by mass of left-hand chiral dopant S811, 3 parts by mass of photoinitiator Irgacure 819, and 10 parts by mass of photopolymerizable liquid crystal monomer HCM008; and the first polymer network stabilized liquid crystal layer and the second polymer network stabilized liquid crystal layer reflect the left-hand polarized light.

The invention claimed is:

1. An electroresponsive liquid crystal dimming device, comprising a first light transmitting conductive substrate, a first polymer network stabilized liquid crystal layer, a positive liquid crystal layer, a second polymer network stabilized liquid crystal layer and a second light transmitting conductive substrate which are arranged in sequence; the first polymer network stabilized liquid crystal layer and the second polymer network stabilized liquid crystal layer are made by curing a liquid crystal mixture by ultraviolet light; the liquid crystal mixture comprises positive liquid crystals, a chiral dopant, a photoinitiator and a photopolymerizable liquid crystal monomer; and the first polymer network stabilized liquid crystal layer and the second polymer network stabilized liquid crystal layer reflect the circularly polarized light having the same polarization direction; wherein in a case that no voltage is applied, the positive liquid crystals distributed in the first polymer network stabilized liquid crystal layer and the second polymer network stabilized liquid crystal layer are in a spiral structural arrangement in which a molecular long axis is parallel to the substrate, and the liquid crystal dimming device is in a dark color and transparent state; in a case that a first voltage is applied, the positive liquid crystals distributed in the positive liquid crystal layer are converted into an arrangement mode in which the molecular long axis is perpendicular to the substrate, and the liquid crystal dimming device is in a light color and transparent state; in a case that a second voltage is applied, the positive liquid crystals distributed in the first polymer network stabilized liquid crystal layer and the second polymer network stabilized liquid crystal layer are converted into a focal conic phase arrangement, and the liquid crystal dimming device is in a colorless and opaque state; in a case that a third voltage is applied, all the positive liquid crystals in the liquid crystal dimming device are converted into an arrangement mode in which the molecular long axis is perpendicular to the substrate, and the liquid crystal dimming device is in a colorless and transparent state.

2. The electroresponsive liquid crystal dimming device according to claim 1, wherein the liquid crystal mixture comprises 50 to 88.9 parts by mass of the positive liquid crystals, 8 to 25 parts by mass of the chiral dopant, 0.1 to 5 parts by mass of the photoinitiator, and 3 to 20 parts by mass of the liquid crystal monomer.

3. (The electroresponsive liquid crystal dimming device according to claim 1, wherein the chiral dopant is a left-hand chiral dopant or a right-hand chiral dopant, and the left-hand chiral dopant is at least one of S1011 and S811, and the right-hand chiral dopant is at least one of R1011 and R811.

4. The electroresponsive liquid crystal dimming device according to claim 1, wherein the liquid crystal monomer is at least one of HCM008 and HCM009.

5. The electroresponsive liquid crystal dimming device according to claim 1, further comprising a power supply assembly which is electrically connected to the first light transmitting conductive substrate and the second light transmitting conductive substrate.

6. The electroresponsive liquid crystal dimming device according to claim 5, wherein the power supply assembly comprises an alternating current power supply and a voltage controller connected in series with the alternating current power supply.

7. The electroresponsive liquid crystal dimming device according to claim 1, wherein the first polymer network stabilized liquid crystal layer and the second polymer network stabilized liquid crystal layer have a thickness of 5-100 μm.

8. The electroresponsive liquid crystal dimming device according to claim 1, wherein the positive liquid crystal layer has a thickness of 5-50 μm.

* * * * *